Dec. 1, 1959 — E. A. STRADER — 2,915,205
BIN LEVEL INDICATOR
Filed Feb. 12, 1959 — 2 Sheets-Sheet 1
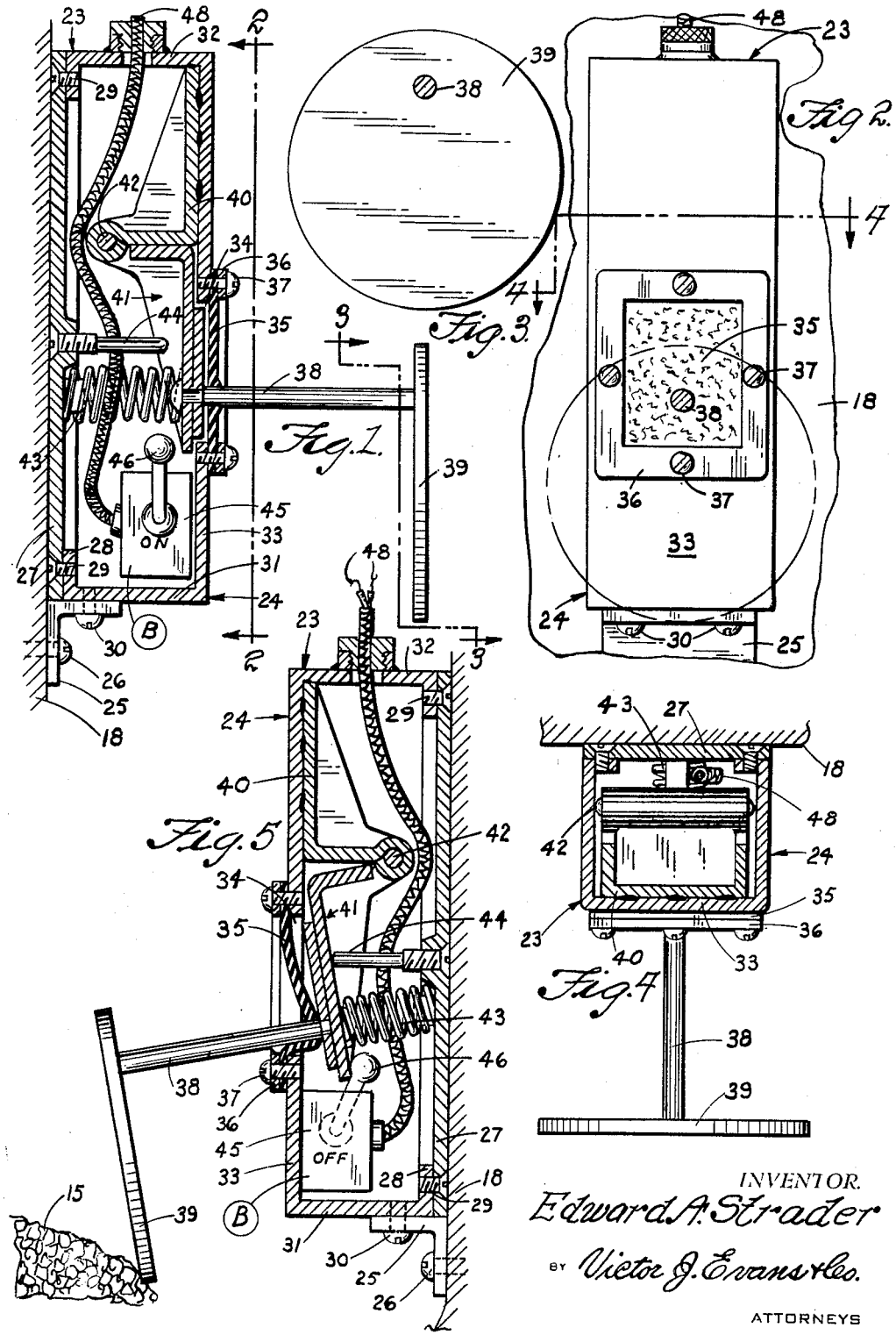
INVENTOR.
Edward A. Strader
BY Victor J. Evans & Co.
ATTORNEYS Dec. 1, 1959 E. A. STRADER 2,915,205
BIN LEVEL INDICATOR
Filed Feb. 12, 1959 2 Sheets-Sheet 2
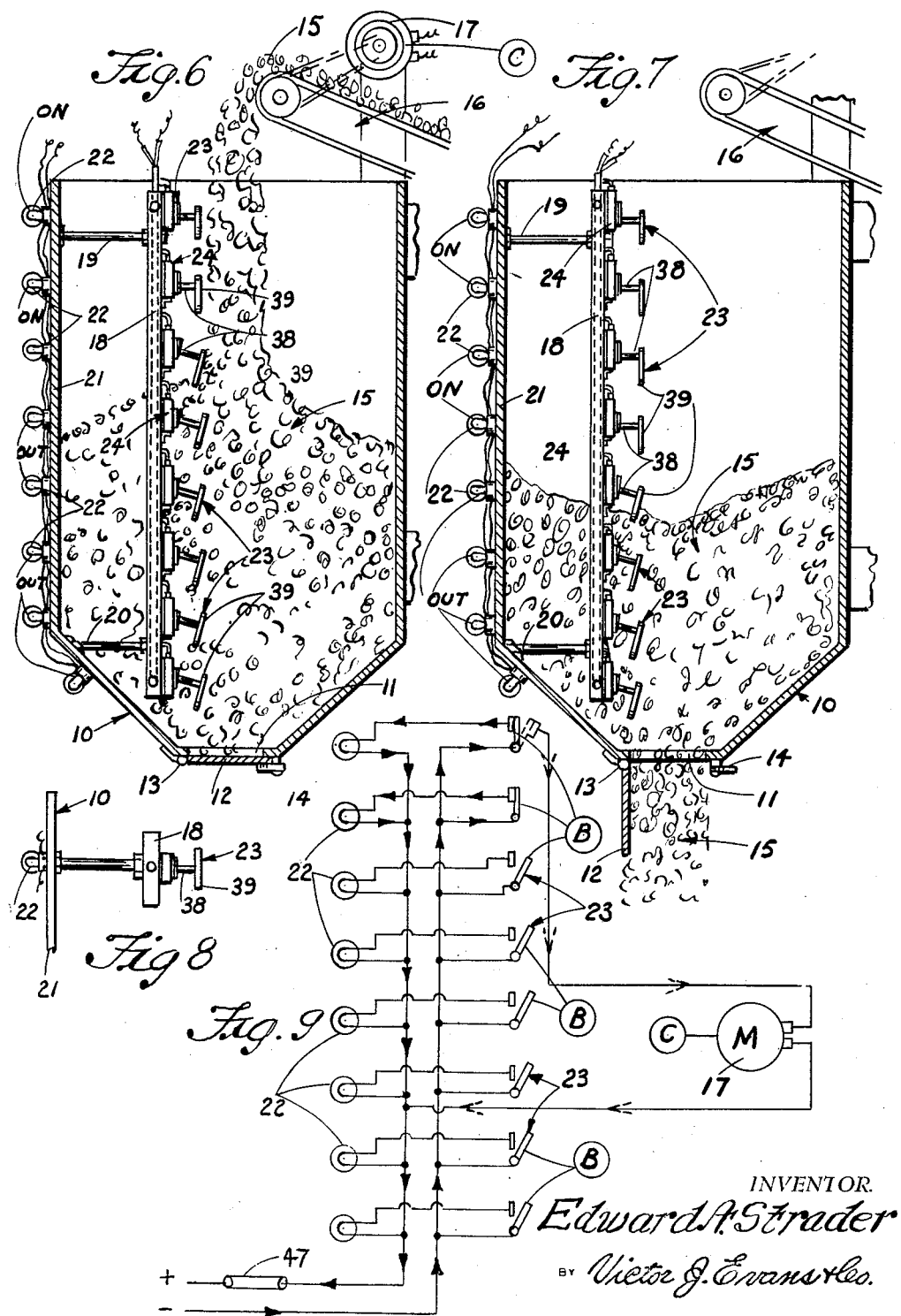
INVENTOR.
Edward A. Strader
BY Victor J. Evans & Co.
ATTORNEYS

# United States Patent Office 2,915,205
Patented Dec. 1, 1959

2,915,205

BIN LEVEL INDICATOR

Edward Alexandra Strader, Massena, N.Y.

Application February 12, 1959, Serial No. 792,752

3 Claims. (Cl. 214—17)

This invention relates to an indicating mechanism and more particularly to an indicator for a bin or container.

The object of the invention is to provide a mechanism which will automatically and accurately indicate the level of material in a bin.

Another object of the invention is to provide a bin level indicator which includes means for actuating lights so that a person can readily observe the lights and ascertain the quantity or level of material in the bin, and wherein a means is provided for automatically stopping the operation of a motor driven loading device when the bin level is at the desired elevation so that overloading the bin will be prevented.

A further object of the invention is to provide a bin level indicator which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a vertical sectional view taken through the actuator.

Figure 2 is a sectional view taken on the line 2—2 of Figure 1.

Figure 3 is a sectional view taken on the line 3—3 of Figure 1.

Figure 4 is a sectional view taken on the line 4—4 of Figure 2.

Figure 5 is a view similar to Figure 1, but showing the device in a reversed position, and with the parts in an adjusted position.

Figure 6 is a vertical sectional view taken through a bin equipped with the indicating mechanism of the present invention, and showing the bin being loaded, and wherein the two top actuators are energized.

Figure 7 is a view somewhat similar to Figure 6, but showing the bin being emptied or discharging, and showing the lower four actuators energized.

Figure 8 is a fragmentary plan view illustrating certain constructional details of the present invention.

Figure 9 is a schematic view illustrating the wiring diagram of the present invention.

Referring in detail to the drawings, the numeral 10 indicates a bin which is provided with a discharge opening 11 in its lower end, and the numeral 12 indicates a door which is mounted for movement into and out of opened or closed relation with respect to the discharge opening 11. The door 12 is hingedly connected to the bin as at 13, and a latch 14 is provided for maintaining the door 12 in closed position with respect to the opening 11, as for example as shown in Figure 6.

The numeral 15 indicates material which is arranged in the bin 10, and this material may be loaded into the bin 10 by means of a conveyor 16 which is adapted to be operated by a motor such as the motor 17.

Arranged within the bin 10 is a vertically disposed support member 18, and as shown in Figures 6 and 7 for example, the support member 18 is positioned approximately midway between the center and outer wall 21 of the bin 10, for a purpose to be later described. The support member 18 is held in place by any suitable means, as for example by means of braces 19 and 20. The numeral 22 designates each of a plurality of vertically spaced apart lights which are supported by the outer wall 21 of the bin 10.

Arranged contiguous to the support member 18 and fastened thereto, is a plurality of spaced apart vertically superimposed actuators which are each indicated by the numeral 23, and each of the actuators 23 has the same construction and each embodies a hollow housing which is indicated by the numeral 24, Figures 1 and 5. The numeral 25 indicates a bracket which is provided for supporting the housing 24 contiguous to the support member 18, and the bracket 25 is fastened to the support member 18 as for example by means of securing elements 26, the bracket 25 being also fastened to the bottom wall 31 of the housing 24 as at 30. As shown in the drawings the housing 24 includes a removable back wall 27 which is connected to a flange 28 of the housing by means of securing elements 29.

The housing 24 also includes a top wall 32 and a front wall 33 which is provided with a generally rectangular opening 34, and the numeral 35 indicates a resilient or rubber seal which extends across the opening 34. The rubber seal 35 is held in place across the opening 34 by means of a retainer 36 which is fastened to a housing as for example by means of securing elements 37.

A movable rod 38 extends through the seal 35, and a circular plate 39 is fastened to the outer end of the rod 38. A base member 40 is secured within the housing 24, and the base member 40 is stationary and may be fastened in place, as for example by welding. The numeral 41 indicates a movable body member which is connected to the inner end of the rod 38, and the body member 41 is hingedly or pivotally connected to the stationary base member 40 by means of a hinge connection 42.

The numeral 43 indicates a coil spring which engages the movable body member 41 for normally urging or maintaining the body member 41 and its associated parts in the position of Figure 1. A stop pin 44 is provided for limiting swinging or pivotal movement of the body member 41, as for example as shown in Figure 5. There is also provided in each housing 24 a conventional "on" and "off" switch 45 which includes a movable arm 46 that is engaged by the movable body member 41, when material such as the material 15 contacts the plate 39.

The numeral 47 indicates the main switch for the circuit.

As shown in Figure 9, there is provided an electrical circuit wherein the motor 17 is electrically connected to the actuators 23 as well as to the lights 22. The electrical circuit includes wires such as the wires 48 which are connected to the switch 45 of the actuator, as for example as shown in Figures 1, 2 and 5.

It is to be noted that with the parts arranged as shown in the drawings, as the material such as the material 15 is loaded into the bin 10 from a device such as the conveyor 16, the material 15 will start to fill up the bin 10, and normally the plates 39 are held in a vertical position due to the provision of the spring 43. Then, as the material 15 moves into the bin 10, and with the door 12 closed as shown in Figure 6, it will be seen that as the material engages the plate 39, it will tilt this plate as for example from the position shown in Figure 1 to the position shown in Figure 5 so as to compress the coil spring 43. The stop member 44 will limit inward swinging movement of the body member 41 on the hinge 42. As the body member 41 is pivoted on the hinge 42, the body member 41 will engage the arm 46 of the switch 45 so as to actuate the switch 45 and this in turn will be indicated by the respective bulb 22 which is connected thereto. Since the bulbs 22 are arranged outside of the bin 10, a person will be able to readily observe the level of material 15 within the bin by observing whether or not the lights 22 are on or off. After the bin 10 is filled with material, the uppermost actuator 23 will be energized so as to cut-off the motor 17 so that no further material will be loaded into the bin from the conveyor 16 whereby overloading of the bin will be automatically prevented. It is to be noted that with the main switch 47 closed, when the top light 22 goes out, the bin is full.

With the parts in the position of Figure 1, the lights are on, and with the parts in the position of Figure 5 the corresponding light is off or out.

The rod 38 is movable and extends through the rubber seal 35 and this rubber seal permits the necessary shifting or pivotal movement of the rod 38, as for example as shown in Figures 1 and 5. The rubber seal 35 is held in place by means of the retainer 36. The housings 24 are maintained connected to the support member 18 by any suitable means, as for example by means of the bracket 25.

The parts can be made of any suitable material and in different shapes or sizes.

In actual practice, when the bin is empty, and after the main switch 47 is moved to closed position, all of the lights 22 will be on. Then, as the bin fills up, the observer can readily ascertain how far up the material 15 is in the bin since the lights 22 will go out one at a time as the bin fills up. The latch 14 can be actuated so as to open the door 12 as for example as shown in Figure 7 so as to permit the material 15 to run out. The conveyor 16 is of conventional construction. The motor 17 is electrically connected to the lights and in Figure 6 for example the top two actuators 23 have not yet been energized by the material 15 whereas the actuators therebelow have already been energized. It is necessary to throw the main switch 47 to "on" position for the mechanism to operate. The rubber seal 35 prevents any of the material from accidentally entering the housing 24. When the plate 39 is pushed to the position of Figure 5, the corresponding light 22 connected to that particular actuator will go out and if there is no material in the bin when the main switch is thrown on, all of the lights will light up and as the material comes in, the lights will be successively turned off or out. When the last light goes off, the motor 17 is automatically turned off so that the bin will not be overloaded.

Thus, it will be provided that there has been provided a bin level indicator which will register or show the exact amount of material such as dust or aggregate stone or other material that is stored or fed into a bin by means of a conveyor belt or other mechanism. Conventional hopper signals will not operate where stone aggregate comes off a conveyor belt in large masses or chunks since other types of signals often become covered by large chunks so that they become inoperative inasmuch as the material cannot reach the proper location to operate such other devices. The signal of the present invention will operate under all types of field conditions and the device is operated by pressure of the aggregate or sand or dust, and the coil spring 43 returns the parts to normal position when the aggregate in the bin is drawn away therefrom. This operation actuates the switch 45 so as to in turn operate the signal light 22, and the parts are constructed so that the material will not foul up the mechanism.

Figure 6 illustrates the bin in the process of being filled, while Figure 7 illustrates the bin emptying.

Primarily the present invention is a level indicator for use in batch plants handling sand and both fine and coarse stone aggregate or other material. In view of the fact that the device is used in a single bin and is often buried under tons of large stone, it is necessary that the actuators be of a definite rugged construction and the actuators are used in a vertical series, and each actuator is connected to a corresponding indicating light on the outside of the bin or hopper, so that the batch plant operator will be able to readily ascertain the exact level of the material in each of the bins.

As an example of the operation of the present invention, beginning with an empty hopper equipped with any number of actuators in the inside of the bin connected in vertical sequence spaced a suitable distance apart, each actuator is connected to a corresponding outside light at the same level. These lights act as a visual illuminated gauge. When the bin is empty all lights are on, and as the aggregate or sand is fed into the hopper by any means such as a conveyor, the bin begins to fill. When the level of the material reaches the first actuator 23, its corresponding outside light will go out, and as the bin fills and the material trips each higher device, its corresponding outside light will go out.

The top or highest actuator 23 is wired to the motor 17 so as to stop the conveyor feed when its light goes out so as to prevent the hopper from overflowing. As the material is emptied from the bin and its level drops and falls away from each actuating switch, its corresponding outside light will go on. By merely checking the lights the operator of the batch plant knows that the level of the material is between the last extinguished and the first lit light above it.

Due to the physical characteristics of sand and stone, none of the previous known devices have worked satisfactorily. Sand and stone have a tendency to run damp or collect moisture. When damp, sand lumps and clings to the sides of the bin. In cold climates both sand and stone will freeze in large chunks and is often fed into the bin in this form by the conveyor. When a diaphragm type actuator is used under these conditions, the wet or frozen sand and stone will cover and cling to it making it inoperative, and this has been proven in batch plants in actual operation. In other words diaphragm type devices will not work in sand or aggregates. Even when dry, the sharp edges of the aggregate wear out the diaphragms in a very short period of time, whereas the level indicator of the present invention with the steel actuating plate 39 eliminates both the clinging of sand as well as the abrasive force of the aggregate hazards.

The present invention will work under all conditions with wet, dry or frozen material and diaphragm types of devices will only last a very short period of time. The present invention is especially suitable for use in batch plants such as plants wherein sand or aggregate is handled. The present invention is capable of operating with any material from fine explosive dust to the largest stone which is stored in a hopper or bin.

An important aspect of the present invention is the placing of the level indicator actuating device approximately half way between the center and the side of the bin, as for example as shown in Figures 6, 7 and 8. It is believed that no signal of any kind will work properly when it is installed on the inside wall of a stone or sand hopper. Damp sand will cling to the sides of the bins and cover the device, indicating that the level of the bin is at this point and actually the bin may be near empty except for the material stuck to the sides.

As shown in Figure 6, when material is loaded into the bin, it will pyramid. With the device located half way between the center and wall 21, a more accurate indication of the exact amount is registered. By the same token, when the material is removed from the bin through the bottom gate, as shown in Figure 7, it will drop from the center forming a cone shaped recess similar to that of a whirlpool. With the present invention located half way between the center and wall, a more accurate indication of the exact amount remaining is registered.

Minor changes in shape, size and rearrangement of details coming within the field of invention claimed may be resorted to in actual practice, if desired.

I claim:

1. In a level indicator, a bin, a plurality of spaced apart actuators arranged in a vertical series within said bin, a plurality of spaced apart indicator lights arranged in a vertical series and said lights being mounted on the outside of the bin, said lights acting as a visual indicator gauge, a motor driven bin loading device electrically connected to said lights and actuators, whereby as the bin fills, a corresponding light will go out, and whereby when the bin is filled to a predetermined level, the motor driven bin loading device will be automatically stopped, a vertically disposed support member for supporting said actuators, said support member being arranged approximately midway between the center and outside of the bin, each of said actuators including a rigid plate for engagement by the material in the bin.

2. In a device of the character described, a bin provided with a discharge opening in its lower end, a conveyor for discharging material into said bin, a motor for operating said conveyor, a gate mounted for movement into and out of opened and closed relation with respect to said discharge opening, a plurality of spaced apart lights arranged in a vertical series mounted on the outside of the bin, a vertically disposed support member arranged in said bin and positioned approximately midway between the center and outside of said bin, a plurality of spaced apart actuators arranged in a vertical series connected to said support member and an electrical circuit connecting said actuators to said lights and to said motor, each of said actuators comprising a hollow housing having a back wall contiguous to said support member, said housing further including a front wall provided with an opening therein, a resilient seal extending over said opening, a movable rod extending through said seal, a plate on the outer end of said rod, a stationary base piece mounted in said housing, a body member fastened to the inner end of said rod and hingedly connected to said base piece, a coil spring engaging said body member, a stop pin for limiting swinging movement of said body member, and an "on" and "off" switch mounted in said housing and operated by movement of said body member.

3. In a bin level indicator, an actuator comprising a hollow housing, said housing including a wall provided with an opening therein, a resilient seal extending across said opening, a movable rod extending through said seal, a rigid plate on the other end of said rod, a stationary base piece mounted in said housing, a body member fastened to the inner end of said rod and hingedly connected to said base piece, a coil spring positioned in said housing and engaging said body member, a stop pin in said housing for limiting swinging movement of said body member.

References Cited in the file of this patent

UNITED STATES PATENTS

| 2,475,404 | Reed | July 5, 1949 |
| 2,571,378 | Parisi | Oct. 16, 1951 |

FOREIGN PATENTS

| 806,266 | France | Sept. 21, 1936 |